US012576418B2

(12) United States Patent (10) Patent No.: US 12,576,418 B2
Sung et al. (45) Date of Patent: Mar. 17, 2026

(54) SUBSTRATE TREATING APPARATUS AND SUBSTRATE TREATING METHOD USING THE SAME

(71) Applicant: SEMES CO., LTD., Chungcheongnam-do (KR)

(72) Inventors: Bo Ramchan Sung, Chungcheongnam-do (KR); Eon Seok Lee, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 751 days.

(21) Appl. No.: 17/942,136

(22) Filed: Sep. 10, 2022

(65) Prior Publication Data

US 2023/0114015 A1 Apr. 13, 2023

(30) Foreign Application Priority Data

Oct. 7, 2021 (KR) ........................ 10-2021-0132784

(51) Int. Cl.
B05B 13/02 (2006.01)
B05B 1/02 (2006.01)
(Continued)

(52) U.S. Cl.
CPC ............ B05B 13/0221 (2013.01); B05B 1/02 (2013.01); B05C 13/02 (2013.01); B05D 3/002 (2013.01);
(Continued)

(58) Field of Classification Search
CPC .................... B65G 2203/0225; B65G 47/2445
See application file for complete search history.

(56) References Cited

U.S. PATENT DOCUMENTS

| | | | |
|---|---|---|---|
| 9,186,910 B2 | 11/2015 | Kang | |
| 9,836,844 B2 | 12/2017 | Miyazaki et al. | |
| 2019/0131156 A1 | 5/2019 | Seo et al. | |

FOREIGN PATENT DOCUMENTS

| | | |
|---|---|---|
| CN | 103935122 | 7/2014 |
| CN | 108749901 | 11/2018 |

(Continued)

OTHER PUBLICATIONS

English translation of CN212147500U. (Year: 2025).*
(Continued)

*Primary Examiner* — Charles Capozzi
(74) *Attorney, Agent, or Firm* — WOMBLE BOND DICKINSON (US) LLP

(57) ABSTRACT

The present disclosure provides a substrate treating apparatus capable of stably moving a substrate and discharging an ink at an accurate position. The substrate treating apparatus of the present disclosure comprises: a stage extending in a first direction and moving a substrate along the first direction; moving units disposed on both sides of the stage extending in the first direction, respectively, and configured to move the substrate in the first direction; and a control unit configured to align the substrate, wherein the moving unit includes a first gripper and a second gripper configured to adsorb one side and the other side of the substrate, respectively, after the first gripper adsorbs one side of the substrate, the control unit aligns the substrate, and after the substrate is aligned, the second gripper adsorbs the other side of the substrate and the substrate is moved in the first direction.

15 Claims, 15 Drawing Sheets

(51) Int. Cl.

| | | |
|---|---|---|
| *B05C 13/02* | (2006.01) | |
| *B05D 3/00* | (2006.01) | |
| *B05D 3/10* | (2006.01) | |
| *B65G 47/24* | (2006.01) | |
| *B65G 47/90* | (2006.01) | |

(52) U.S. Cl.

CPC .............. *B05D 3/10* (2013.01); *B65G 47/24* (2013.01); *B65G 47/905* (2013.01); *B65G 2203/0216* (2013.01); *B65G 2203/044* (2013.01)

(56) References Cited

FOREIGN PATENT DOCUMENTS

| | | |
|---|---|---|
| CN | 109720874 | 5/2019 |
| CN | 212147500 | 12/2020 |
| JP | 2015-186771 A | 10/2015 |
| JP | 2021-041657 | 3/2021 |
| KR | 10-2007-0021604 A | 2/2007 |
| KR | 10-2014-0093109 | 7/2014 |
| KR | 10-2016-0023999 | 3/2016 |
| KR | 10-2019-0048562 | 5/2019 |
| KR | 10-2019-0108202 A | 9/2019 |
| KR | 10-2020148 | 11/2019 |
| KR | 10-2020-0049112 A | 5/2020 |
| KR | 10-2021-0034168 A | 3/2021 |
| KR | 10-2021-0076939 | 6/2021 |

OTHER PUBLICATIONS

English translation of KR20210034168. (Year: 2025).*

English translation of KR20190108202. (Year: 2025).*

Office Action dated Jul. 30, 2023 for Korean Patent Application No. 10-2021-0132784 and its English translation by Google Translate.

Office Action (1st) dated May 31, 2025 for Chinese Patent Application No. 202211125574.2 and its English translation from Global Dossier.

Notice of Allowance dated May 10, 2024 for Korean Patent Application No. 10-2021-0132784 and its English machine translation provided by Global Dossier.

* cited by examiner

110H_1  110_H2

110H_1

110H : 110H_1, 110H_2

160 : 161,162,163,164

160 : 161,162,163,164

200 : 200a,200b

160 : 161,162,163,164

SUBSTRATE TREATING APPARATUS AND SUBSTRATE TREATING METHOD USING THE SAME

CROSS-REFERENCE TO RELATED APPLICATION

This application claims priority from Korean Patent Application No. 10-2021-0132784 filed on Oct. 7, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a substrate treating apparatus and a substrate treating method using the same.

2. Description of the Related Art

In general, in order to manufacture a flat panel display (FPD) such as an electronic circuit component or a liquid crystal display panel, a constant pattern such as electrodes or dots should be formed on a glass surface or a printed circuit board (PC) using a photoresist (PR) solution or a metal paste such as copper (Cu), silver (Ag), or aluminum (Al).

A scheme of directly patterning a constant pattern in an offset printing manner using two rolls or a scheme of discharging ink droplets may be used as a method to form a constant pattern on a substrate. Herein, an inkjet printing system for discharging ink droplets onto a substrate is similar to a general inkjet printer, and uses a scheme of directly patterning a constant pattern on a substrate using a nozzle.

The inkjet printing system discharges ink droplets on the substrate while moving the substrate in a certain direction. In order to discharge the ink droplets to a desired position, the substrate should be stably moved. When the substrate is not constantly moved in a straight direction, the ink droplets may not be accurately discharged to the desired position.

SUMMARY

Aspects of the present disclosure provide a substrate treating apparatus and a substrate treating method using the same that can stably move a substrate and discharge an ink to an accurate position.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an aspect of the present disclosure, there is provided a substrate treating apparatus comprising: a stage extending in a first direction and moving a substrate along the first direction; moving units disposed on both sides of the stage extending in the first direction, respectively, and configured to move the substrate in the first direction; and a control unit configured to align the substrate. The moving unit includes a first gripper and a second gripper configured to adsorb one side and the other side of the substrate, respectively. After the first gripper adsorbs one side of the substrate, the control unit aligns the substrate. After the substrate is aligned, the second gripper adsorbs the other side of the substrate and the substrate is moved in the first direction.

In some embodiments, the first gripper is rotatable on a second direction perpendicular to the first direction.

In some embodiments, the first and second grippers may yaw-control the substrate while moving the substrate in the first direction.

The substrate treating apparatus further includes a measurement unit installed on the stage and configured to photograph an alignment mark disposed at an apex of the substrate.

In some embodiments, when the alignment mark deviates from a predetermined reference point, the control unit sets a position of the alignment mark to the predetermined reference point, using an image with the alignment mark photographed by the measurement unit.

The substrate treating apparatus further includes a head unit installed in a gantry extending in the second direction different from the first direction, on the stage, and configured to discharge a droplet towards the substrate, and the head unit can move in the second direction.

In some embodiments, the stage includes a first region and a second region. The first region is a region onto which the substrate is loaded and where the first and second grippers adsorb a first surface and a second surface of the substrate, respectively; in its turn, the second region is a region in which a printing process is performed for the substrate.

In some embodiments, the first region is a region of spraying air towards the substrate, while the second region is a region of spraying air towards the substrate and inhaling air between the substrate and the second region.

According to another aspect of the present disclosure, there is provided a substrate treating apparatus comprising: a stage extending in a first direction and moving a substrate marked with an alignment mark along the first direction; a measurement unit including a camera corresponding to the alignment mark of the substrate and configured to photograph the alignment mark, on the stage; a first gripper configured to adsorb a first surface of the substrate and rotatable on a second direction perpendicular to the first direction; a second gripper configured to adsorb a second surface facing the first surface of the substrate; and a control unit configured to control the first gripper. The camera of the measurement unit photographs the alignment mark after the first gripper adsorbs the first surface. The control unit receives an image photographed by the camera and rotates the first gripper to align the substrate. After aligning the substrate, the second gripper adsorbs the second surface of the substrate.

The substrate treating apparatus moves the substrate in the first direction after the second gripper adsorbs the substrate, and performs a printing process for the substrate.

In some embodiments, the first and second grippers can yaw-control the substrate while moving the substrate in the first direction.

In some embodiments, the stage includes a first region and a second region. The first region is a region onto which the substrate is loaded and where the first and second grippers adsorb the substrate; in its turn, the second region is a region where a printing process is performed for the substrate.

In some embodiments, the first region is a region of spraying air towards the substrate, while the second region is a region of spraying air towards the substrate and inhaling air between the substrate and the second region.

The substrate treating apparatus further includes a head unit installed in a gantry extending in a third direction different from the first and second directions, on the stage, and configured to discharge a droplet towards the substrate, and the measurement unit is installed on the first region of the stage, and the head unit is installed on the second region of the stage.

In some embodiments, the alignment mark is disposed at an apex of the substrate.

According to an aspect of the present disclosure, there is provided a substrate treating method comprising: loading a substrate with an alignment mark into a first region of a stage; adsorbing a first surface extending in a first direction of the substrate using a first gripper; photographing the alignment mark of the substrate; aligning the substrate by rotating the first gripper; adsorbing a second surface facing the first surface of the substrate using a second gripper different from the first gripper; moving the substrate in the first direction; and performing a printing process for the substrate in a second region of the stage.

In some embodiments, the alignment mark is disposed at an apex of the substrate.

In some embodiments, the first region of the stage is a region of spraying air towards the substrate, while the second region of the stage is a region of spraying air towards the substrate and inhaling air between the substrate and the second region.

The substrate treating method further includes yaw-controlling the substrate while moving the substrate in the first direction.

In some embodiments, when the alignment mark deviates from a predetermined reference point, aligning the substrate sets a position of the alignment mark to the predetermined reference point, using an image with the alignment mark photographed.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
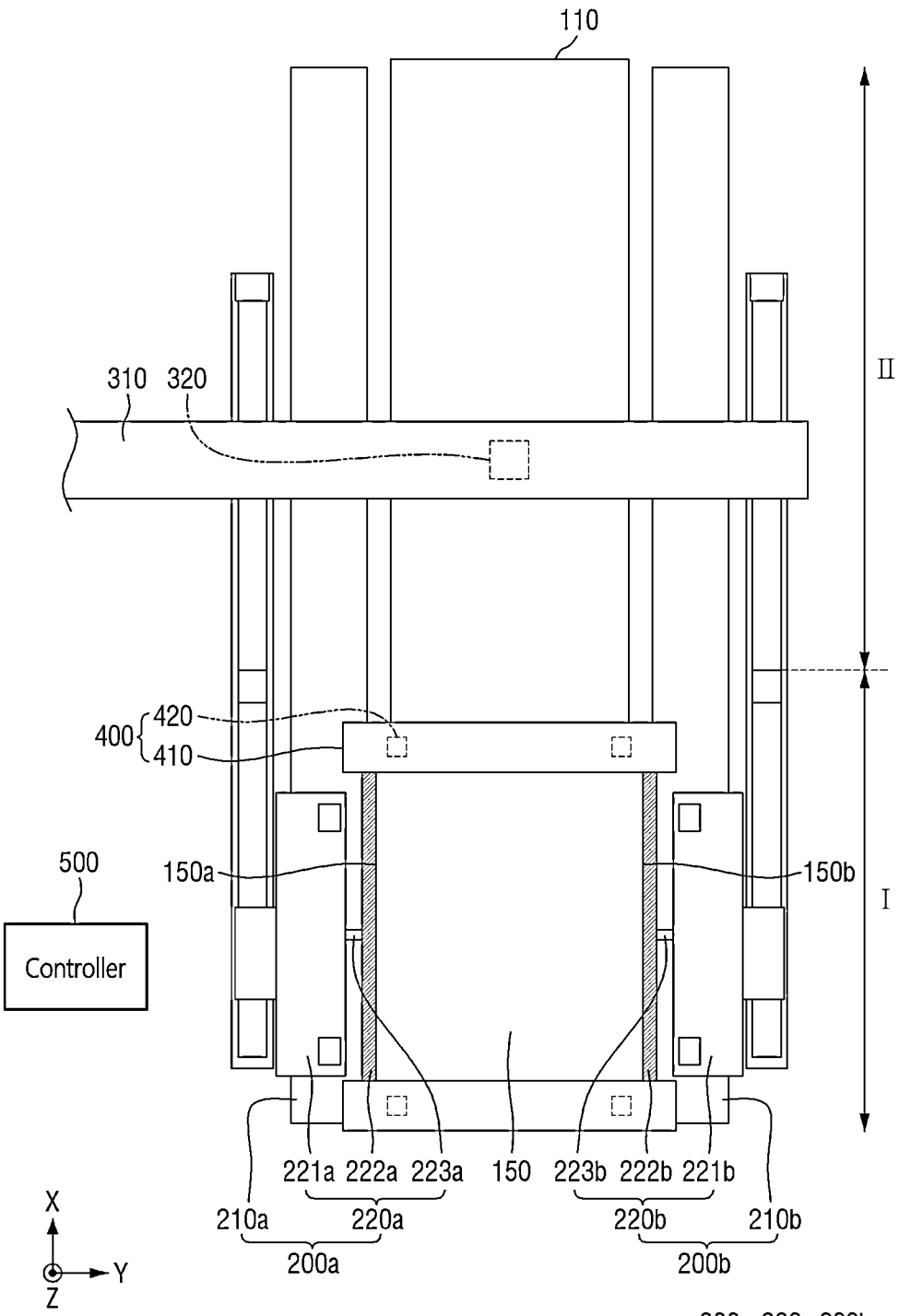
FIG. 1 is an exemplary top plan view describing a substrate treating apparatus according to some embodiments.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. Like numbers refer to like elements throughout the description of the figures.

Indicating that elements or layers are "on" other elements or layers include both a case in which the corresponding elements are just above other elements and a case in which the corresponding elements are intervened with other layers or elements. On the other hand, what is referred to as "directly on" or "directly on" indicates that there is no intervening layers or elements in between.

The spatially relative terms "below," "beneath," "lower," "above," "upper" may be used to easily describe the correlation of a device or components with other devices or components. Spatially relative terms are to be understood as including terms in different directions of the device in use or operation in addition to the directions shown in the figures. For example, when flipping a device shown in the figure, a device described as "below" or "beneath" of another device may be placed "above" of another device. Thus, the exemplary term "below" can encompass both an orientation of above and below. The device can also be oriented in other directions, so that spatially relative terms can be interpreted according to orientation.

Although the first, second, etc. are used to describe various elements, components and/or sections, these elements, components and/or sections are of course not limited by these terms. These terms are only used to distinguish one element, component or section from another element, component or section. Therefore, the first device, the first component, or the first section mentioned below may be a second device, a second component, or a second section within the technical spirit of the present disclosure.

The terminology used herein is for the purpose of describing particular embodiments only and is not intended to be limiting of the disclosure. In this specification, the singular also includes the plural unless specifically stated otherwise in the phrase. As used herein, "comprises" and/or "comprising" refers to the presence of one or more other components, steps, operations and/or elements. Or does not exclude additions.

Unless otherwise defined, all terms (including technical and scientific terms) used in the present specification may be used in a sense that can be commonly understood by those skilled in the art. In addition, the terms defined in the commonly used dictionaries are not ideally or excessively interpreted unless they are specifically defined clearly.

Hereinafter, exemplary embodiments of the present disclosure will be described below in detail with reference to the accompanying drawings in which the same reference numbers are used throughout this specification to refer to the same or like parts. In describing the present disclosure, a detailed description of known functions and configurations will be omitted when it may obscure the subject matter of the present disclosure.

Hereinafter, a substrate treating apparatus according to some embodiments will be described with reference to FIGS. 1 to 5. The substrate treating apparatus according to some embodiments may be an inkjet printing system.

Figure 2:
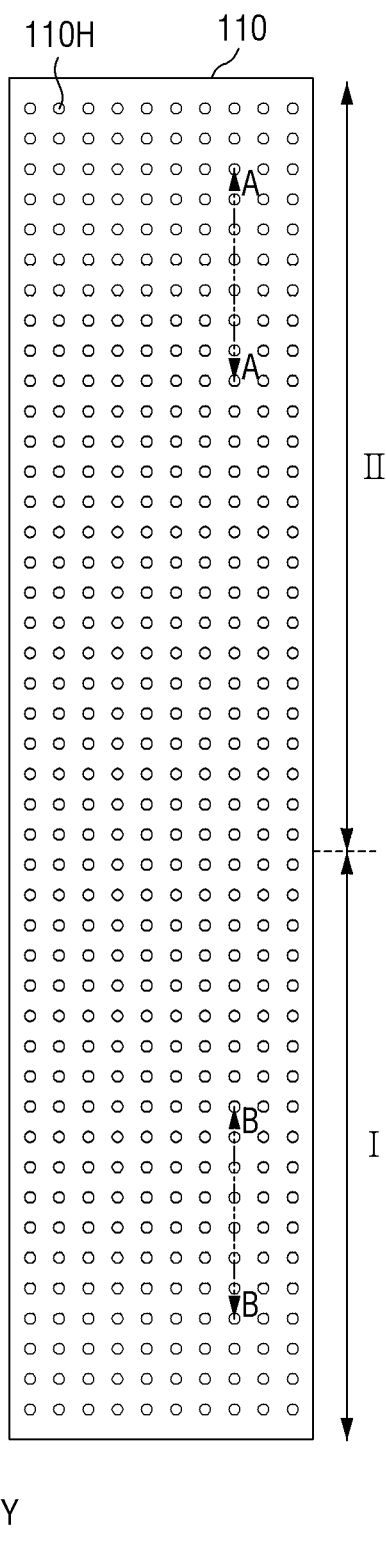
FIG. 2 is a schematic sectional view describing a substrate treating apparatus according to some embodiments.
Figure 3:
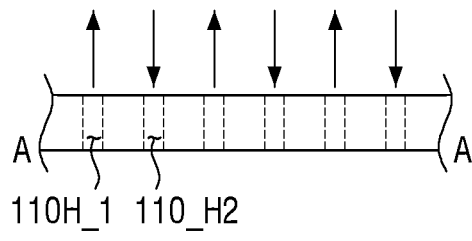
FIG. 3 is a top plan view describing the stage of FIG. 1.
Figure 3:
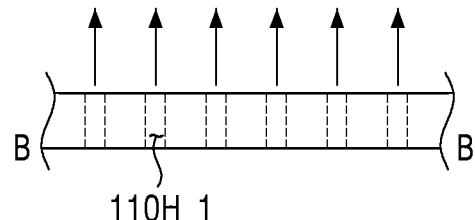
Figure 4:
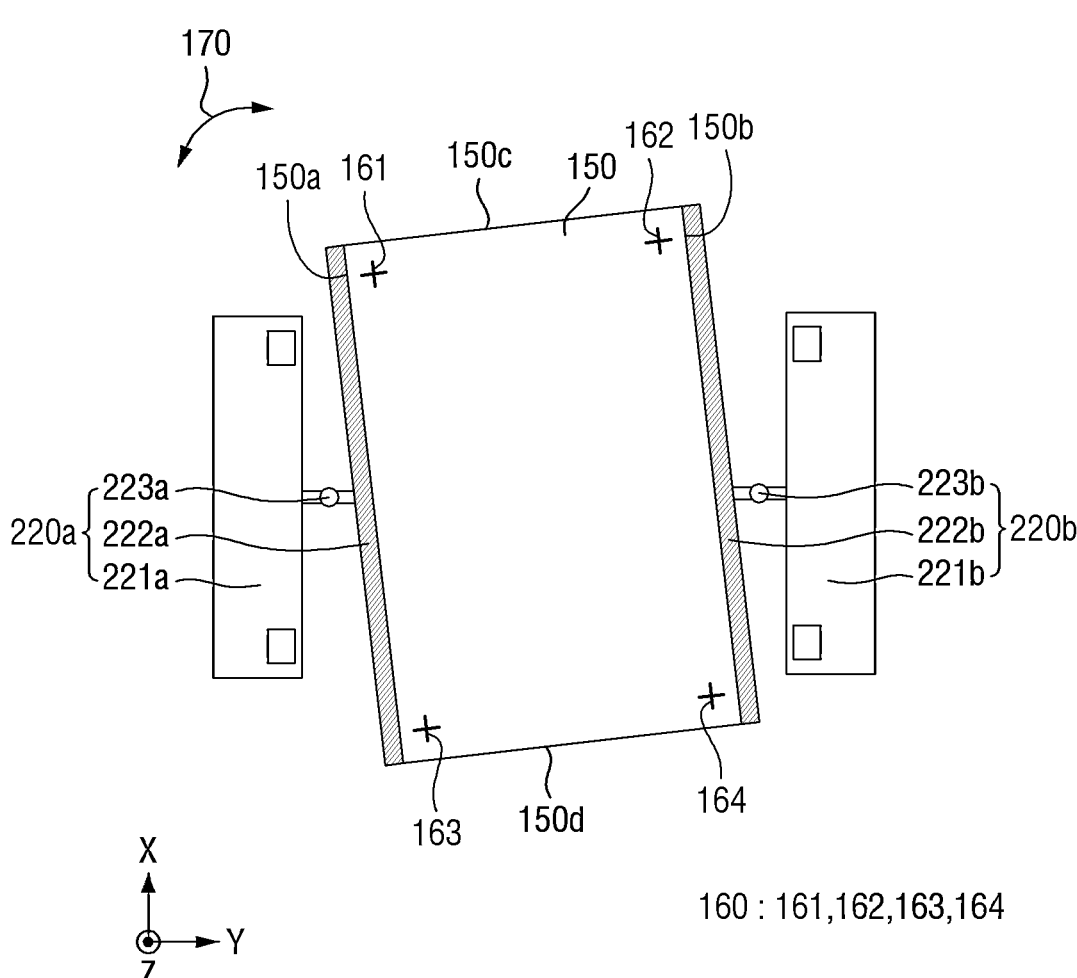
FIG. 4 is a sectional view taken along lines A-A and B-B of FIG. 3.
Figure 5:
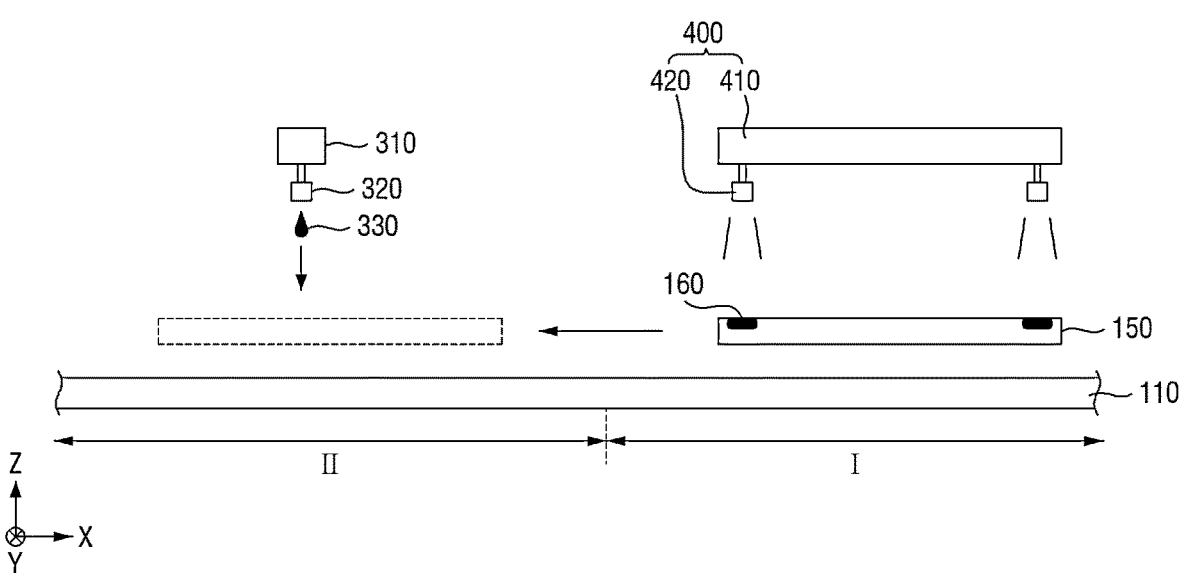
FIG. 5 is a conceptual diagram describing a substrate, a first gripper, and a second gripper of FIG. 1.

FIG. 1 is an exemplary top plan view describing a substrate treating apparatus according to some embodiments. FIG. 2 is a top plan view describing the stage of FIG. 1. FIG. 3 is a sectional view taken along lines A-A and B-B of FIG. 2. FIG. 4 is a conceptual diagram describing a substrate, a first gripper, and a second gripper of FIG. 1. FIG. 5 is a schematic sectional view describing the substrate treating apparatus according to some embodiments.

First, referring to FIG. 1, the substrate treating apparatus according to some embodiments may include a stage 110, a moving unit 200, a gantry 310, a head unit 320, a measurement unit 400, and a control unit 500.

The stage 110 is a region of supporting and moving a substrate 150. A method to move the substrate 150 in the stage 110 is not limited to a specific method. Although a substrate treating apparatus for holding and moving the substrate 150 by first and second grippers is illustrated in the present specification, the present disclosure is not limited thereto. For example, the substrate 150 may be moved by a plate that is moved in a roll-to-roll scheme.

The stage 110 may extend in a first direction X. For example, the stage 110 may include a short side extending in a second direction Y and a long side extending in the first direction X. In the present specification, the first direction X and the second direction Y may be directions crossing each other. A third direction Z may cross the first direction X and the second direction Y. For example, the first direction X, the second direction Y, and the third direction Z may be substantially perpendicular to each other.

On the stage 110, the substrate 150 may be moved along the first direction X. Herein, the substrate 150 may be a transparent substrate (e.g., a glass substrate) used in a display device. For example, the substrate 150 may be a glass substrate for mass production.

Referring to FIGS. 2 and 3, the stage 110 may include a first region (region I) and a second region (region II).

For example, the stage 110 may be an air floating system including the first region (region I) and the second region (region II). The first region (region I) and the second region (region II) of the stage 110 may be continuous. However, the present disclosure is not limited thereto.

Unlike the configuration illustrated the drawings, the first region (region I) of the stage 110 may be disposed at both ends of the stage 110, and the second region (region II) of the stage 110 may be disposed at a central portion of the stage 110. That is, the second region (region II) of the stage 110 may be disposed between the first regions I.

The first region (region I) of the stage 110 may be a region that injects air in the third direction Z. The first region (region I) of the stage 110 may be a region that does not inhale air on the first region (region I). The first region (region I) may be a region where the substrate 150 is loaded onto or taken out to the stage. The first region (region I) may be a region where a printing process is not performed. For example, the first region (region I) may be a region where the head unit 320 does not discharge an ink droplet towards the substrate 150.

The second region (region II) of the stage 110 may be a region that inhales air on the second region (region II) while spraying air in the third direction Z. For example, the second region (region II) of the stage 110 may be a region that inhales air between the substrate 150 and the stage 110 while spraying air towards the substrate 150. Furthermore, the second region (region II) may be a region where a printing process is performed. The second region (region II) may be a region where the head unit 320 discharges ink droplets towards the substrate 150.

In some embodiments, the stage 110 may include a plurality of holes 110H. The hole 110H may be a hole for spraying air or a hole for inhaling air. For example, only the hole for spraying air may be disposed in the first region (region I) of the stage 110. The hole for spraying air and the hole for inhaling air may be alternately disposed in the second region (region II) of the stage 110.

In FIG. 3, the hole 110H of the stage 110 may include a first hole 110H_1 and a second hole 110H_2. The first hole 110H_1 may be a hole for spraying air. The second hole 110H_2 may be a hole for inhaling air.

The second region (region II) of the stage 110 may include the first hole 110H_1 for spraying air upwards and the second hole 110H_2 for inhaling air. Although the first hole 110H_1 and the second hole 110H_2 are illustrated to be alternately arranged, the present disclosure is not limited thereto. The first region (region I) of the stage 110 may include only the first hole 110H_1 for spraying air upwards.

Referring back to FIG. 1, the moving unit 200 may be disposed on both sides of the stage 110. The moving unit 200 may be disposed on the long side of the stage 110 extending in the first direction X. The moving unit 200 may include a first moving unit 200a and a second moving unit 200b. The first moving unit 200a may be disposed on one side of the stage 110. The second moving unit 200b may be disposed on the other side of the stage 110. The moving unit 200 may move the substrate 150 on the stage 110 in the first direction X.

The first moving unit 200a includes a first moving rail 210a and a first gripper 220a. The first moving rail 210a extends long in the first direction X. The first moving rail 210a is a rail capable of moving the first gripper 220a in the first direction X. The first gripper 220a may be coupled to the first moving rail 210a to move in the first direction X. Since the first gripper 220a grips the substrate 150, the first moving rail 210a may move the substrate 150 in the first direction X.

The first gripper 220a may be installed on the first moving rail 210a. The first gripper 220a may adsorb and fix the substrate 150. The first gripper 220a adsorbs one side 150a of the substrate 150. For example, when the substrate 150 includes a long side extending in the first direction X and a short side extending in the second direction Y, the first gripper 220a adsorbs and fixes one of the long sides of the substrate 150.

The second moving unit 200b includes a second moving rail 210b and a second gripper 220b. The second moving rail 210b extends long in the first direction X. The second moving rail 210b is a rail capable of moving the second gripper 220b in the first direction X. The second gripper 220b may be coupled to the second moving rail 210b to move in the first direction X. Since the second gripper 220b grips the substrate 150, the second moving rail 210b may move the substrate 150 in the first direction X.

The second gripper 220b may be installed on the second moving rail 210b. The second gripper 220b may adsorb and fix the substrate 150. The second gripper 220b adsorbs one side of the substrate 150. The first gripper 220a may adsorb one side of the substrate 150, and the second gripper 220b may adsorb the other side 150b of the substrate 150. For example, the second gripper 220b adsorbs and fixes the long side 150b of the substrate 150 in which the first gripper 220a is not adsorbed.

When the substrate 150 is moved in the first direction X, the first gripper 220a and the second gripper 220b may be in a state where they adsorb one side 150a and the other side 150b of the substrate 150, respectively. That is, in the substrate treating apparatus according to some embodiments, the first gripper 220a may adsorb one side 150a of the substrate 150, and the second gripper 220b may adsorb the other side 150b of the substrate 150, thereby more stably moving the substrate 150.

FIG. 4 illustrates the substrate 150, the first gripper 220a, and the second gripper 220b in more detail. Referring to FIG. 4, the substrate 150 includes a first surface 150a, a second surface 150b, a third surface 150c, and a fourth surface 150d.

The first surface 150a may be a long side of the substrate 150. The second surface 150b may be a long side facing the first surface 150a. The third surface 150c and the fourth surface 150d may be short sides connecting the first surface 150a and the second surface 150b.

The substrate 150 includes an alignment mark 160. The alignment mark 160 may be a mark configured to determine whether the substrate 150 is aligned. Although the alignment mark 160 is shown to have a cross shape, the present disclosure is not limited thereto.

The alignment mark 160 may be disposed at an apex of the substrate 150. For example, the alignment mark 160 may include a first alignment mark 161, a second alignment mark 162, a third alignment mark 163, and a fourth alignment mark 164. The first alignment mark 161 may be disposed at an apex where the first surface 150a meets the third surface 150c. The second alignment mark 162 may be disposed at an apex where the second surface 150b meets the third surface 150c. The third alignment mark 163 may be disposed at an apex where the first surface 150a meets the fourth surface 150d. The fourth alignment mark 164 may be disposed at an apex where the second surface 150b meets the fourth surface 150d. Details of aligning the substrates 150 using the respective alignment marks 160 will be described below with reference to FIGS. 11 and 12.

The first gripper 220a includes a first support part 221a, a first adsorption part 222a, and a first rotation center 223a. The first support 221a may be a portion connected to the first moving rail 210a. The first support part 221a may support and fix the first rotation center 223a and the first adsorption part 222a. The first adsorption part 222a may be a portion that adsorbs and fixes the substrate 150. The first adsorption part 222a adsorbs the first surface 150a of the substrate 150. The first rotation center 223a may be a portion that makes the first adsorption part 222a rotatable. For example, the first rotation center 223a may rotate clockwise or counterclockwise on the third direction Z (see reference numeral 170).

The second gripper 220b includes a second support part 221b, a second adsorption part 222b, and a second rotation center 223b. The second support 221b may be a portion connected to the second moving rail 210b. The second support part 221b may support and fix the second rotation center 223b and the second adsorption part 222b. The second adsorption part 222b may be a portion that adsorbs and fixes the substrate 150. The second adsorption part 222b adsorbs the second surface 150b of the substrate 150. The second rotation center 223b may be a portion that makes the second adsorption part 222b rotatable. For example, the second rotation center 223b may rotate clockwise or counterclockwise on the third direction Z (see reference numeral 170).

In some embodiments, the first and second grippers 220a and 220b may yaw-control the substrate 150 while moving the substrate 150 in the first direction X. Yaw refers to rotation around a vertical axis. A yaw control means that the substrate 150 is controlled to move in a straight line in the first direction X by rotating the substrate 150 on the third direction Z.

As described above, the first rotation center 223a of the first gripper 220a may rotate clockwise or counterclockwise on the third direction Z (see reference numeral 170). The second rotation center 223b of the second gripper 220b may also rotate clockwise or counterclockwise on the third direction Z (see drawing reference numeral 170).

The substrate treating apparatus according to some embodiments may rotate the substrate 150 clockwise or counterclockwise on the third direction Z while moving the substrate 150 in the first direction X using the first and second grippers 220a and 220b. In other words, the first and second grippers 220a and 220b can serve to help the substrate 150 make a straight motion in the first direction X. As a result, the first gripper 220a and the second gripper 220b can perform yaw control for the substrate 150.

For example, as illustrated in FIG. 4, the substrate 150 may be disposed in a direction oblique to the first direction X. The first surface 150a of the substrate 150 may extend in an arbitrary direction between the first direction X and the second direction Y. The first gripper 220a and the second gripper 220b may perform yaw control to help the substrate 150 to proceed in parallel with the first direction X. The first gripper 220a and the second gripper 220b may rotate the substrate 150 such that the first surface 150a of the substrate 150 may be parallel to the first direction X. The first gripper 220a and the second gripper 220b may rotate the substrate 150 clockwise.

Referring back to FIG. 1, the gantry 310 may be disposed on the stage 110 to cross the stage 110. For example, the gantry 310 may extend long in the second direction Y. The gantry 310 may be disposed on the second region (region II) of the stage 110.

The head unit 320 may be installed in the gantry 310 to move along the gantry 310. The head unit 320 may move in the second direction Y, but the present disclosure is not limited thereto now. The head unit 320 may include a plurality of heads for discharging the ink droplet. Each head may include a plurality of nozzles. The ink droplet discharged by the head unit 320 may be, for example, a QD (Quantum Dot) ink, but the present disclosure is not limited thereto. The plurality of nozzles of the head unit 320 may discharge a plurality of ink droplets to the substrate 150.

The measurement unit 400 may be installed on the first region (region I) of the stage 110. The measurement unit 400 may generate an image by photographing the alignment mark 160 of the substrate 150. The measurement unit 400 may include a camera support unit 410 and a plurality of cameras 420. The camera support unit 410 may be a portion where the camera 420 is installed. The camera 420 may be a portion that photographs the alignment mark 160 of the substrate 150. The camera 420 may correspond to each alignment mark 160. For example, the camera 420 may include a first camera (not shown) corresponding to the first alignment mark 161, a second camera (not shown) corresponding to the second alignment mark 162, a third camera (not shown) corresponding to the third alignment mark 163, and a fourth camera (not shown) corresponding to the fourth alignment mark 164.

The control unit 500 may align the substrates 150. The control unit 500 may control the first gripper 220a and the second gripper 220b. For example, the control unit 500 may control the first rotation center 223a of the first gripper 220a and control the second rotation center 223b of the second gripper 220b to align the substrates 150. If the substrate 150 is inclined by a predetermined angle with respect to the first direction X, the control unit 500 may rotate the substrate 150 in the direction opposite to the inclined direction.

When the control unit 500 aligns the substrates 150, the first gripper 220a may be adsorbed to one side 150a of the substrate 150, and the second gripper 220b may not be adsorbed to the other side 150b of the substrate 150. In other words, the substrate 150 may be loaded, the first gripper 220a may adsorb one side 150a of the substrate 150, and the control unit 500 may align the substrate 150. After the control unit 500 aligns the substrates 150, the second gripper 220b adsorbs the other side 150b of the substrate 150, and the substrate 150 may be moved in the first direction X.

Referring to FIG. 5, the substrate 150 is loaded into the first region (region I) of the stage 110. On the first region (region I) of the stage 110, the measurement unit 400 photographs the alignment mark 160 of the substrate 150, and the control unit 500 aligns the substrates 150 using the photographed image. The substrate 150 moves to the second region (region II) of the stage 110. The head unit 320 may discharge an ink droplet 330 on the substrate 150 in the second region (region II) of the stage 110. In the second region (region II), the printing process may be performed for the substrate 150.

Hereinafter, a substrate treating method according to some embodiments will be described with reference to FIGS. 6 to 15.

Figure 6:
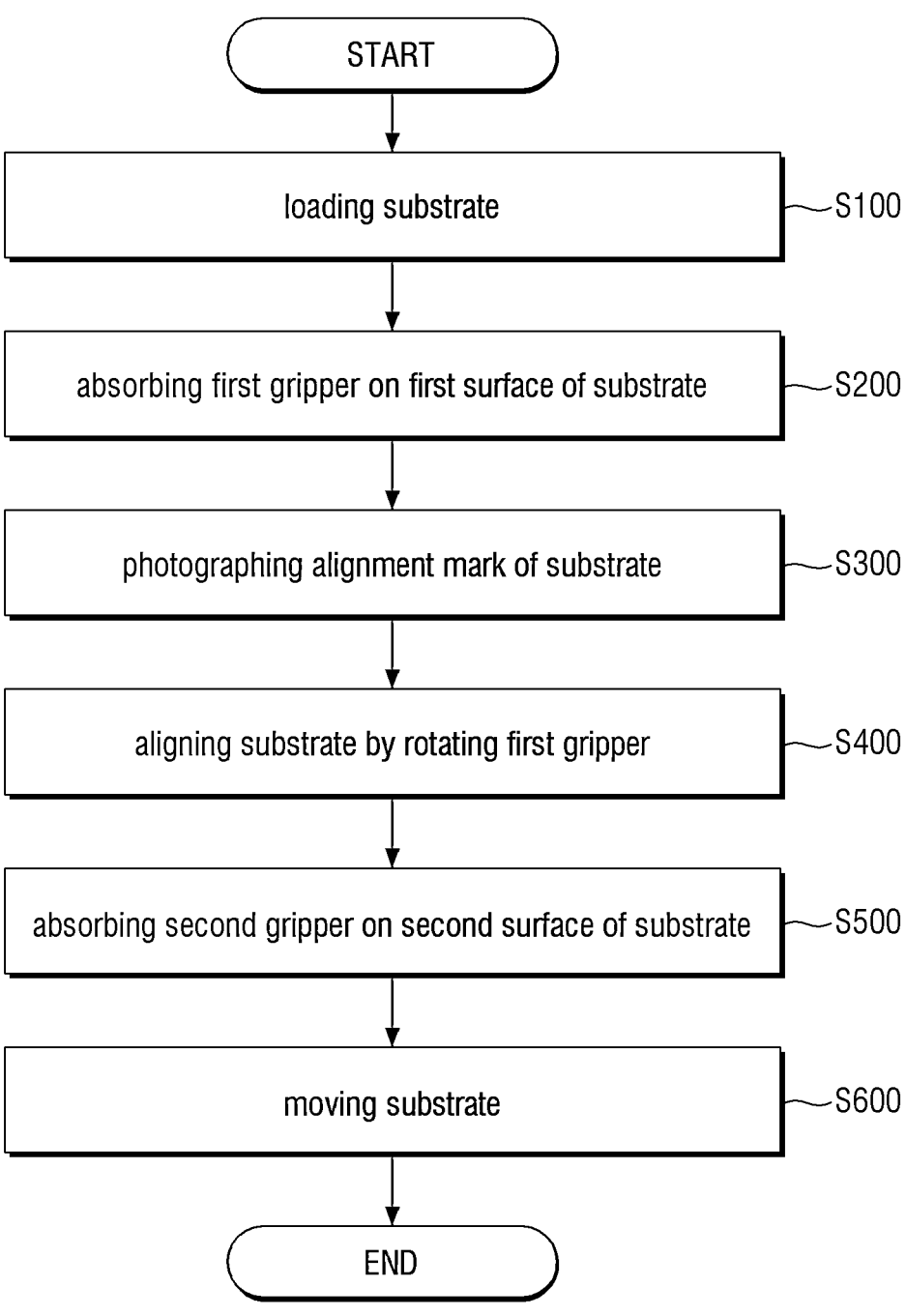
FIG. 6 is a flowchart describing a substrate treating method according to some embodiments.

FIG. 6 is a flowchart describing a substrate treating method according to some embodiments.

Referring to FIGS. 1 and 6, in the substrate treating method according to some embodiments, the substrate 150 may be loaded (S100), the first gripper 220a adsorbs the first surface of the substrate 150 (S200), the measurement unit 400 photographs the alignment mark 160 of the substrate 150 (S300), the first gripper 220a may be rotated to align the substrate 150 (S400), and the second gripper 220b may adsorb the second surface of the substrate 150 (S500) and move the substrate 150.

Although not illustrated in the drawings, after the substrate 150 is moved in the first direction X, the printing process may be further performed by discharging the ink droplet on the substrate 150 in the second region (region II) of the stage 110.

Figure 7:
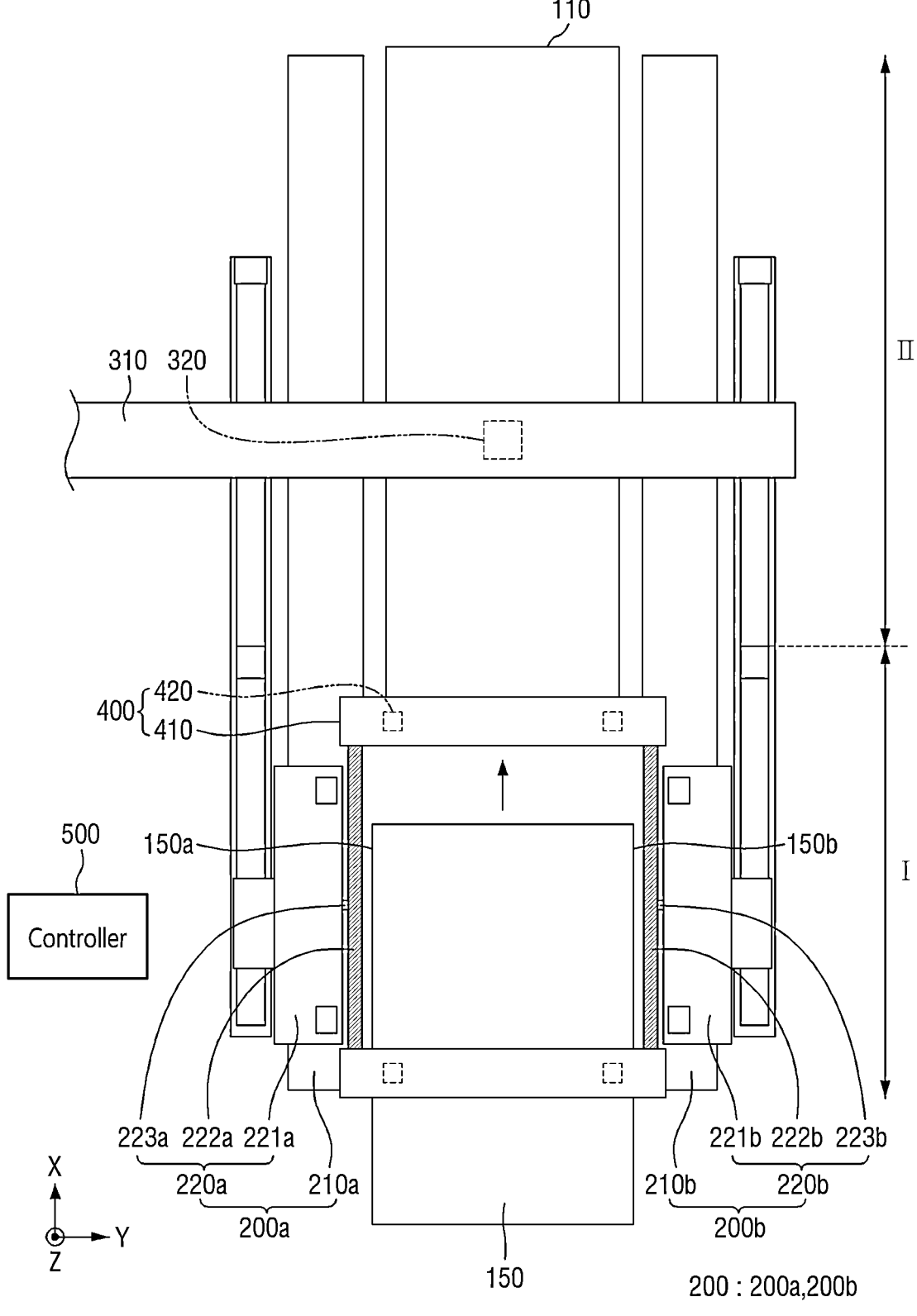
FIGS. 7 and 8 are diagrams describing step S100 of FIG. 6.
Figure 8:
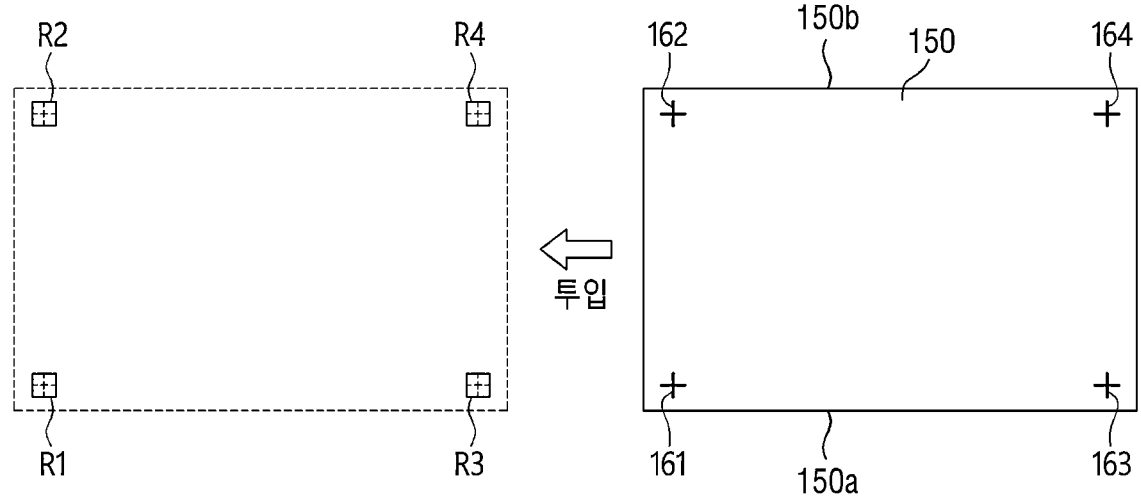

FIGS. 7 and 8 are diagrams describing the step S100 of FIG. 6. The step S100 will be described in more detail with reference to FIGS. 7 and 8.

Referring to FIG. 7, the substrate 150 may be loaded. The substrate 150 may be loaded into the first region (region I) of the stage 110. The substrate 150 may be moved to a first position.

Specifically, referring to FIG. 8, the first position may be a position where the first to fourth alignment marks 161, 162, 163 and 164 of the substrate 150 correspond to first to fourth reference points R1, R2, R3 and R4. The positions of the first to fourth reference points R1, R2, R3 and R4 may be positions where the camera 420 of the measurement unit 400 is installed.

Figure 9:
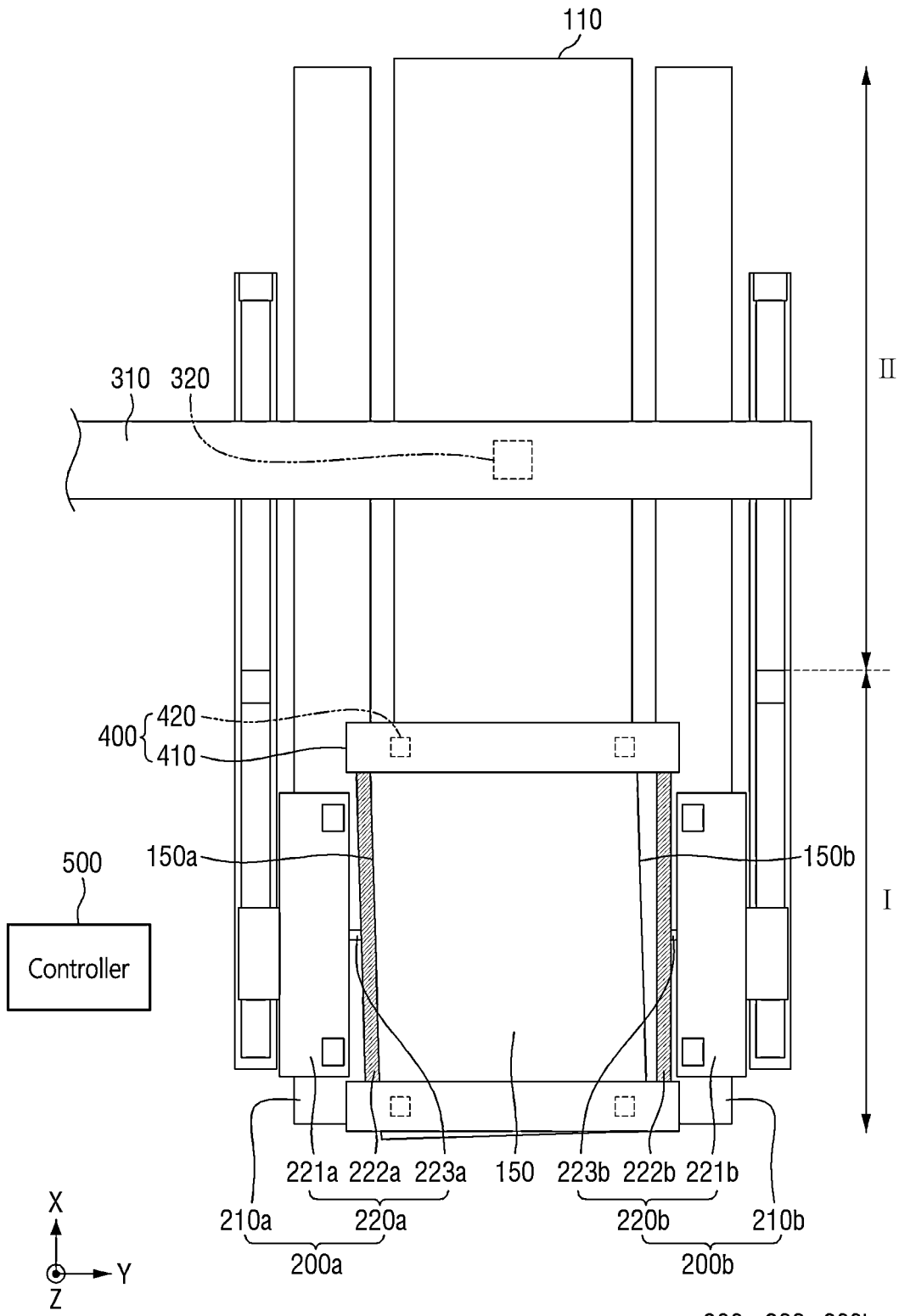
FIGS. 9 and 10 are diagrams describing step S200 of FIG. 6.
Figure 10:
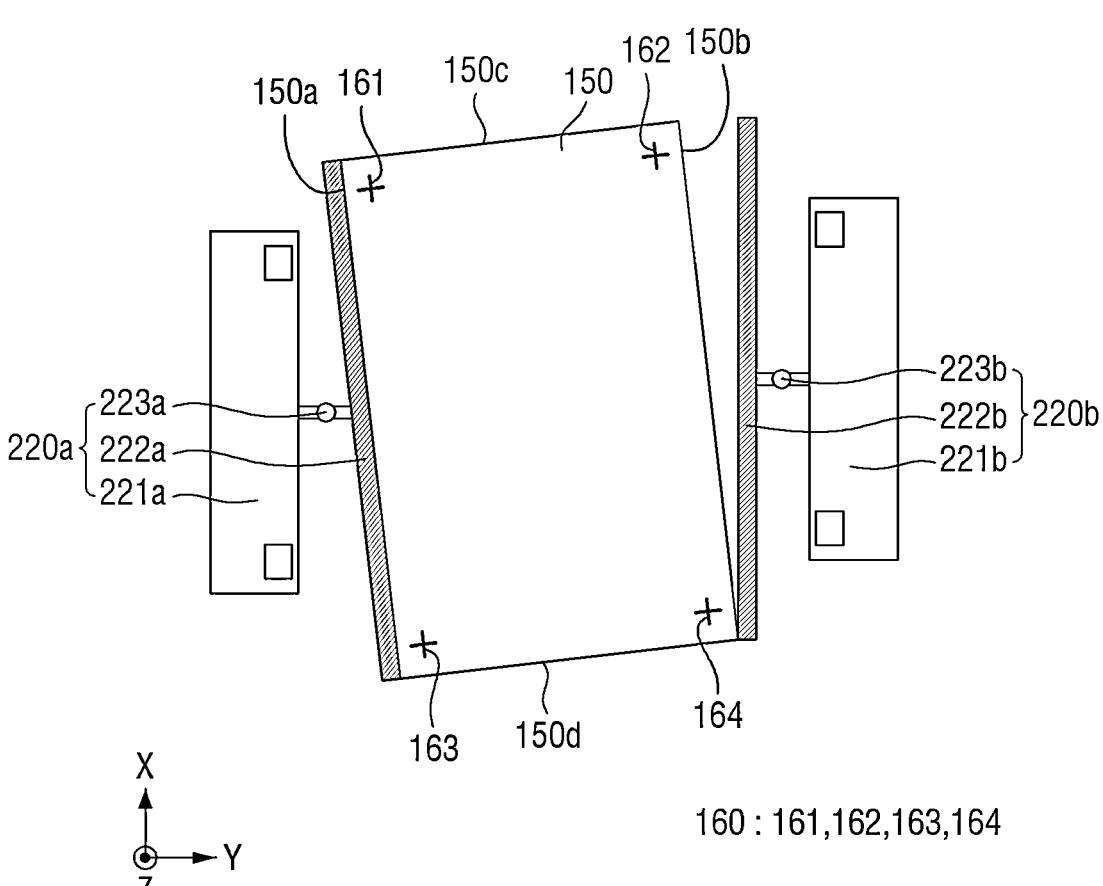

FIGS. 9 and 10 are diagrams describing the step S200 of FIG. 6. The step S200 will be described in more detail with reference to FIGS. 9 and 10.

Referring to FIGS. 9 and 10, the substrate 150 is loaded to the first position. Although not illustrated in FIG. 9, the alignment marks 160 of the substrate 150 may overlap the cameras 420 of the measurement unit 400 in the third direction Z.

After loading the substrate 150, the first gripper 220a may adsorb the first surface 150a of the substrate 150. In that case, the second gripper 220b does not adsorb the second surface 150b of the substrate 150.

Figure 11:
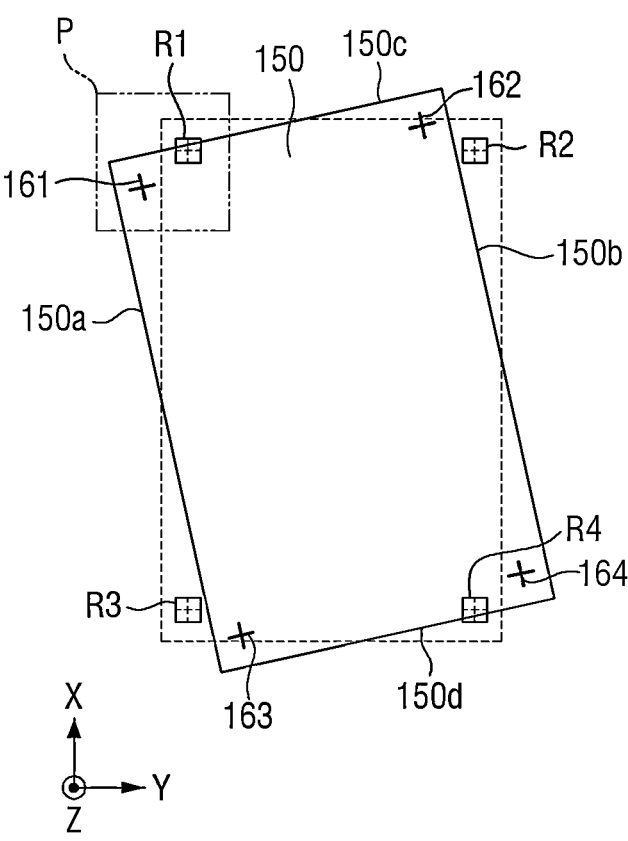
FIGS. 11 and 12 are diagrams describing steps S300 and S400 of FIG. 6.
Figure 12:
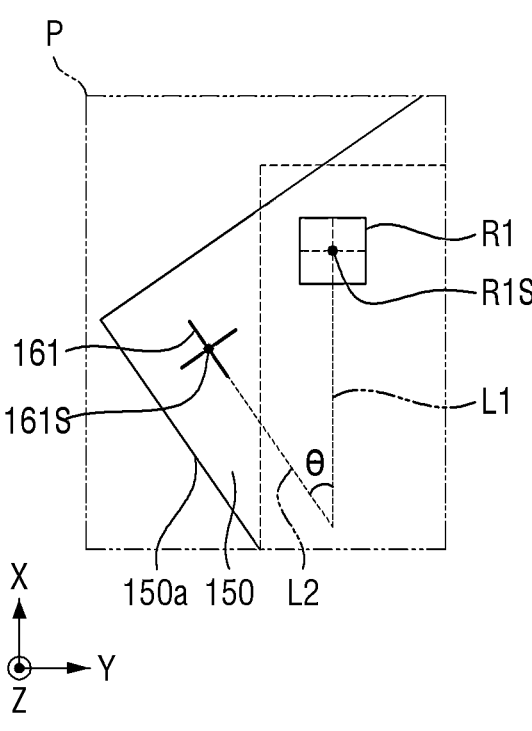

FIGS. 11 and 12 are diagrams describing the steps the S300 and S400 of FIG. 6. For reference, FIG. 12 is an enlarged view of region P of FIG. 11. The steps S300 and S400 will be described in more detail with reference to FIGS. 11 and 12.

Referring to FIGS. 11 and 12, the substrate 150 may be inclined with respect to the first direction X. The substrate 150 may be loaded in a state that it is inclined. The substrate 150 may be loaded in a state that it is unaligned.

The first alignment mark 161 may correspond to the first reference point R1, the second alignment mark 162 may correspond to the second reference point R2, the third alignment mark 163 may correspond to the third reference point R3, and the fourth alignment mark 164 may correspond to the fourth reference point R4. The substrate 150 may be aligned using the first to fourth reference points R1, R2, R3 and R4 and the first to fourth alignment marks 161, 162, 163 and 164. Since using the second alignment mark 162 and the second reference point R2, using the third alignment mark 163 and the third reference point R3, and using the fourth alignment mark 164 and the fourth reference point R4 are the same as using the first alignment mark 161 and the first reference point R1, only using the first alignment mark 161 and the first reference point R1 will be described below.

In the case where a center R1S of the first reference point R1 is (0,0) coordinates, when a center 161S of the first alignment mark 161 is disposed at (0,0) coordinates, the first alignment mark 161 may be determined to be aligned. When the first to fourth alignment marks 161, 162, 163 and 164 are aligned, the substrate 150 may be determined to be aligned.

First, the camera 420 of the measurement unit 400 photographs the first alignment mark 161. It should be checked whether the center 161S of the first alignment mark 161 is disposed in the center R1S of the first reference point R1 using the photographed image. When the first alignment mark 161 deviates from the first reference point R1, a position of the first alignment mark 161 may be set to the first reference point R1.

In FIG. 12, the first alignment mark 161 may be inclined by a first angle (θ). An angle at which a first line L1 perpendicular to the first direction X, passing through the center R1S of the first reference point R1, meets a second line L2 passing through the center 161S of the first alignment mark 161, may be the first angle (θ).

The first gripper 220a may rotate the substrate 150 by the first angle (θ). For example, the first rotation center 223a of the first gripper 220a may be rotated clockwise by the first angle (θ). When the substrate 150 is rotated clockwise by the first angle (θ), the center 161S of the first alignment mark 161 may coincide with the center R1S of the first reference point R1. Similarly, centers of the second to the fourth alignment marks 162, 163 and 164 may coincide with centers of the second to fourth reference points R2, R3 and R4.

In this case, the substrate 150 is determined to be aligned.

Figure 13:
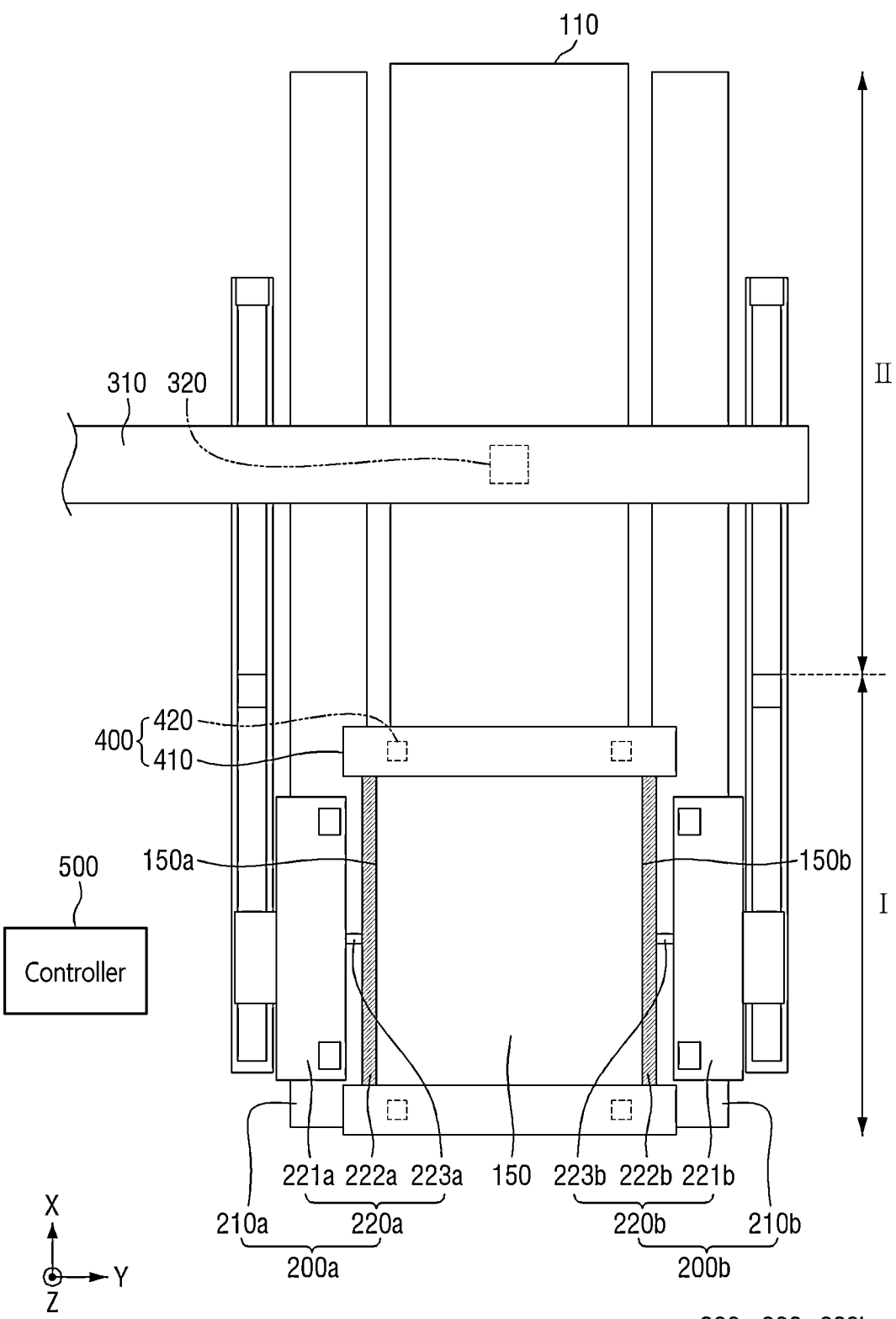
FIGS. 13 and 14 are diagrams describing step S500 of FIG. 6.
Figure 14:
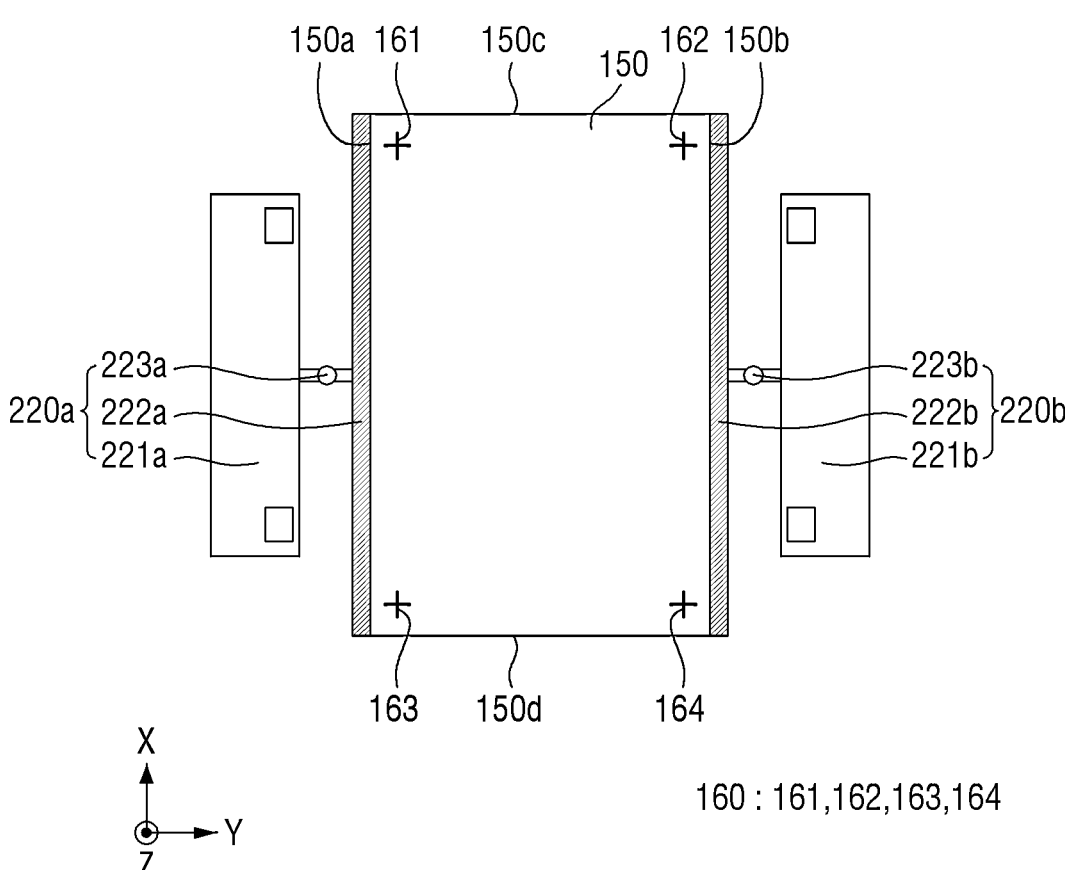

FIGS. 13 and 14 are diagrams describing the step S500 of FIG. 6. The step S500 will be described in more detail with reference to FIGS. 13 and 14.

Referring to FIGS. 13 and 14, the second gripper 220b may adsorb the second surface of the substrate 150. In the state that the substrate 150 is aligned, the second gripper 220b adsorbs the second surface 150b of the substrate 150. The substrate 150 may be disposed in parallel with the first direction X.

Figure 15:
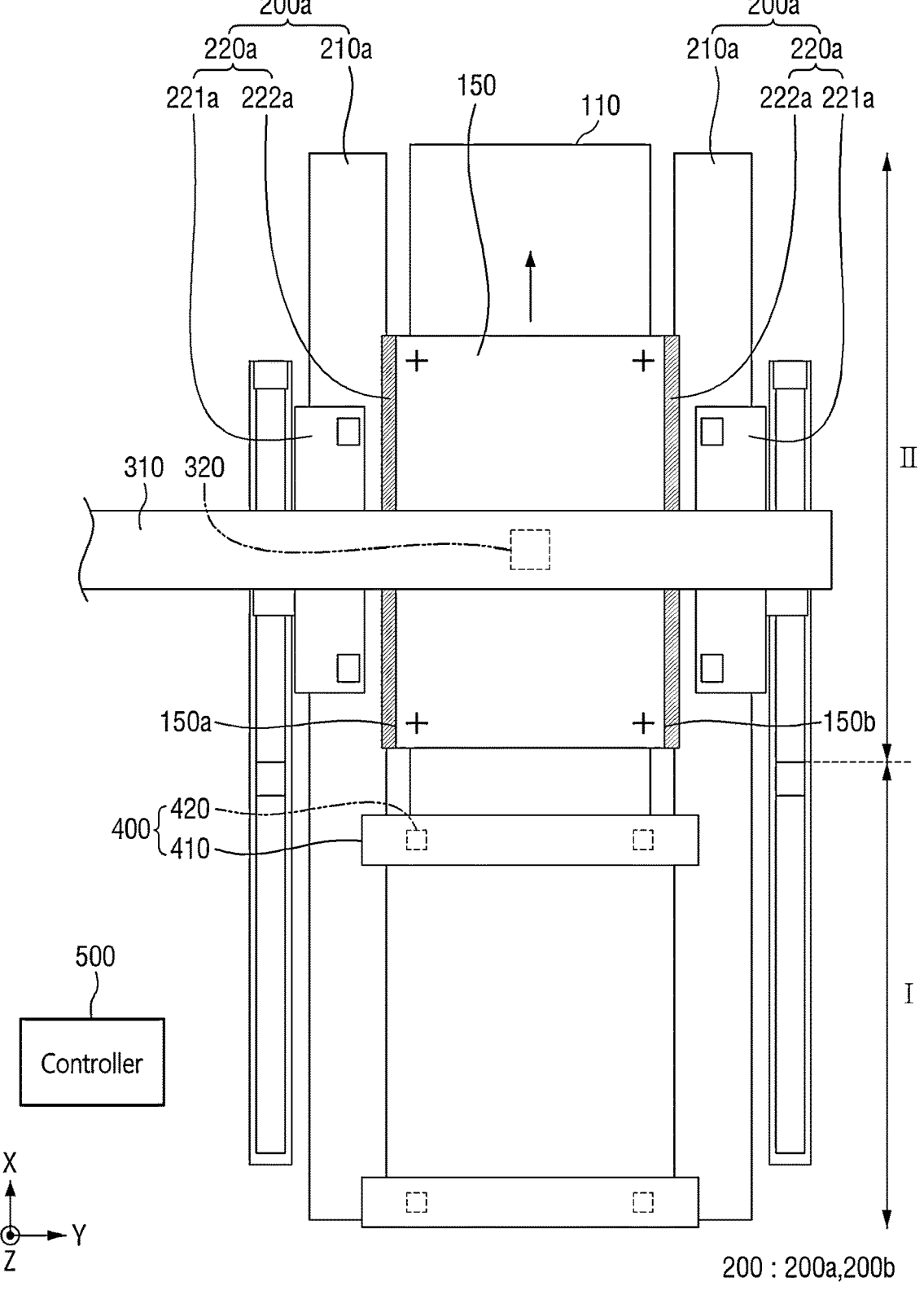
FIG. 15 is a diagram describing step S600 of FIG. 6.

FIG. 15 is a diagram describing step the S600 of FIG. 6.

Referring to FIG. 15, the substrate 150 may be moved in the first direction X. The first gripper 220*a* and the second gripper 220*b* may adsorb and fix one side 150*a* and the other side 150*b* of the substrate 150, respectively. The first gripper 220*a* and the second gripper 220*b* are moved in the first direction X along the first moving rail 210*a* and the second moving rail 220*b*, respectively.

While the substrate 150 is moved in the first direction X, the first gripper 220*a* and the second gripper 220*b* may perform yaw control for the substrate 150. The substrate 150 may be moved to the second region (region II) of the stage 110, and the printing process may be performed for the substrate 150 in the second region (region II). The head unit 320 installed on the second region (region II) may discharge the ink droplet onto the substrate 150.

In the substrate treating apparatus according to some embodiments, the first gripper 220*a* and the second gripper 220*b* adsorb both sides of the substrate 150, thus moving the substrate 150, and since the first gripper 220*a* and the second gripper 220*b* may yaw-control the substrate 150, they may move the substrate 150. In addition, since the substrate 150 is stably moved in the first direction X, the ink droplet may be accurately discharged to a desired position.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. A substrate treating apparatus, comprising:
   a stage extending in a first direction and moving a substrate along the first direction;
   moving units disposed on both sides of the stage extending in the first direction, respectively, and configured to move the substrate in the first direction; and
   a control unit configured to align the substrate;
   wherein the moving units include a first gripper and a second gripper configured to adsorb one side and the other side of the substrate, respectively,
   after the first gripper adsorbs one side of the substrate, the control unit is configured to align the substrate, and
   after the substrate is aligned, the control unit is configured to control the second gripper to adsorb the other side of the substrate and the substrate is moved in the first direction.

2. The substrate treating apparatus of claim 1, wherein the first gripper is rotatable on a second direction different from the first direction.

3. The substrate treating apparatus of claim 1, wherein the first and second grippers can yaw-control the substrate while moving the substrate in the first direction.

4. The substrate treating apparatus of claim 1, further comprising a measurement unit installed on the stage and configured to photograph an alignment mark disposed at an apex of the substrate.

5. The substrate treating apparatus of claim 4, wherein when the alignment mark deviates from a predetermined reference point, the control unit sets a position of the alignment mark to the predetermined reference point, using an image with the alignment mark photographed by the measurement unit.

6. The substrate treating apparatus of claim 1, further comprising a head unit installed in a gantry extending in a second direction different from the first direction, on the stage, and configured to discharge a droplet towards the substrate,
   wherein the head unit can move in the second direction.

7. The substrate treating apparatus of claim 1, wherein the stage includes a first region and a second region,
   the first region is a region onto which the substrate is loaded and where the first and second grippers adsorb a first surface and a second surface of the substrate, respectively, and
   the second region is a region where a printing process is performed for the substrate.

8. The substrate treating apparatus of claim 7, wherein the first region is a region of spraying air towards the substrate, and
   the second region is a region of spraying air towards the substrate and inhaling air between the substrate and the second region.

9. A substrate treating apparatus, comprising:
   a stage extending in a first direction and moving a substrate marked with an alignment mark along the first direction;
   a measurement unit including a camera corresponding to the alignment mark of the substrate and configured to photograph the alignment mark, on the stage;
   a first gripper configured to adsorb a first surface of the substrate and rotatable on a second direction perpendicular to the first direction;
   a second gripper configured to adsorb a second surface facing the first surface of the substrate; and
   a control unit configured to control the first gripper;
   wherein the camera of the measurement unit photographs the alignment mark after the first gripper adsorbs the first surface,
   the control unit configured to receive an image photographed by the camera and rotate the first gripper to align the substrate, and
   after aligning the substrate, the control unit is configured to control the second gripper to adsorb the second surface of the substrate.

10. The substrate treating apparatus of claim 9, wherein the substrate treating apparatus moves the substrate in the first direction after the second gripper adsorbs the substrate, and performs a printing process for the substrate.

11. The substrate treating apparatus of claim 9, wherein the first and second grippers can yaw-control the substrate while moving the substrate in the first direction.

12. The substrate treating apparatus of claim 9, wherein the stage includes a first region and a second region,
   the first region is a region onto which the substrate is loaded and where the first and second grippers adsorb the substrate, respectively, and
   the second region is a region where a printing process is performed for the substrate.

13. The substrate treating apparatus of claim 12, wherein the first region is a region of spraying air towards the substrate, and the second region is a region of spraying air towards the substrate and inhaling air between the substrate and the second region.

14. The substrate treating apparatus of claim 12, further comprising a head unit installed in a gantry extending in a third direction different from the first and second directions, on the stage, and configured to discharge a droplet towards the substrate, wherein the measurement unit is installed on the first region of the stage, and the head unit is installed on the second region of the stage.

15. The substrate treating apparatus of claim 10, wherein the alignment mark is disposed at an apex of the substrate.   5

* * * * *